US007974876B2

(12) United States Patent
Do

(10) Patent No.: US 7,974,876 B2
(45) Date of Patent: Jul. 5, 2011

(54) METHOD AND SYSTEM FOR CREATING ADVERTISEMENT-LIST WHICH DIVIDES BIG ADVERTISER'S ADVERTISING INFORMATION

(75) Inventor: Gwan-Pyo Do, Gyeonggi-do (KR)

(73) Assignee: NHN Business Platform Corporation, Seongnam-si (KR)

(*) Notice: Subject to any disclaimer, the term of this patent is extended or adjusted under 35 U.S.C. 154(b) by 1137 days.

(21) Appl. No.: 11/690,220

(22) Filed: Mar. 23, 2007

(65) Prior Publication Data

US 2007/0226060 A1    Sep. 27, 2007

(30) Foreign Application Priority Data

Mar. 27, 2006    (KR) .................. 10-2006-0027310

(51) Int. Cl.
*G06F 15/16* (2006.01)
*G06F 7/00* (2006.01)
*G06F 11/30* (2006.01)

(52) U.S. Cl. .............. 705/14.41; 707/103; 709/203; 709/224

(58) Field of Classification Search .............. 707/3, 103; 709/203, 224
See application file for complete search history.

(56) References Cited

U.S. PATENT DOCUMENTS

| | | | |
|---|---|---|---|
| 6,401,118 B1 * | 6/2002 | Thomas | 709/224 |
| 6,606,644 B1 * | 8/2003 | Ford et al. | 709/203 |
| 6,873,996 B2 * | 3/2005 | Chand | 1/1 |
| 7,007,014 B2 | 2/2006 | Liu et al. | |
| 2003/0208474 A1 * | 11/2003 | Soulanille et al. | 707/3 |

OTHER PUBLICATIONS

The Asian Wall Street Journal. Corporate News: Dethroning king of beers?; Chinese brand Snow challenges Bud Light as top-selling brew, Sep. 11, 2008.*

* cited by examiner

*Primary Examiner* — John G Weiss
*Assistant Examiner* — Marilyn Macasiano
(74) *Attorney, Agent, or Firm* — H.C. Park & Associates, PLC

(57) ABSTRACT

A method and system for creating an advertising list including a big advertiser's advertising information, which can prevent a big advertiser's advertising information, less associated with a content page, from being displaying only because the big advertiser purchased a plurality of keywords, and thereby control 'the Poor Get Poorer and the Rich Get Richer' phenomenon in displaying advertising is provided. According to the present invention, there is provided a method and system for creating an advertising list, which can control 'the Poor Get Poorer and the Rich Get Richer' phenomenon in displaying advertising where a big advertiser's advertising information with a great purchasing power is preferentially displayed in an advertising list and thus small and medium advertisers' advertising information may not be displayed.

15 Claims, 6 Drawing Sheets

FIG. 3 i)

CONTENT PAGE

DICTIONARY IN YOUR MOBILE PHONE

TECHNOLOGY OF INSTALLING AN ELECTRONIC DICTIONARY FUNCTION IN A MOBILE PHONE HAS BEEN DEVELOPED.

THIS MOBILE PHONE IS SUPPORTED BY NUMBER 010 .....

...

ADVERTISING LIST

010 MOBILE PHONE SHOP – MOBILE PHONE ...

http://www.010mobilephoneshop.com

AUCTION 010 MOBILE PHONE – 010 NEW...

http://www.auction.co.kr

AUCTION 010 SHOPPING – 010 NEW...

http://www.auction.co.kr

AUCTION 010 PURCHASE – 010 NEW...

http://www.auction.co.kr ii) TEXT-IN-KEYWORD    010

| ADVERTISING INFORMATION | RANKING POINT | FIRST PENALTY | SECOND PENALTY | DETERMINED RANKING POINT |
|---|---|---|---|---|
| AUCTION 010 PURCHASE | 20 | 97/100 | 900/1000 | 17.46 |
| AUCTION 010 SHOPPING | 21 | 97/100 | 900/1000 | 18.33 |
| AUCTION 010 MOBILE PHONE | 22 | 97/100 | 900/1000 | 19.21 |
| 010 MOBILE PHONE SHOP | 20 | | | 20 |

US 7,974,876 B2

METHOD AND SYSTEM FOR CREATING ADVERTISEMENT-LIST WHICH DIVIDES BIG ADVERTISER'S ADVERTISING INFORMATION

CROSS-REFERENCE TO RELATED APPLICATION

This application claims the benefit of Korean Patent Application No. 10-2006-0027310, filed on Mar. 27, 2006, in the Korean Intellectual Property Office, the disclosure of which is incorporated herein by reference.

BACKGROUND OF THE INVENTION

1. Field of the Invention

The present invention relates to a method and system for creating an advertising list including a big advertiser's advertising information, which can prevent a big advertiser's advertising information, less associated with a content page, from being displaying only because the big advertiser purchased a plurality of keywords, and thereby control 'the Poor Get Poorer and the Rich Get Richer' phenomenon in displaying advertising.

2. Description of Related Art

Among current advertising services, a contextual advertising service identifies a content of a web document that a user corresponding to a searcher reads, and displays advertising corresponding to the identified content for the user. The contextual advertising service may identify advertising which the user is interested in, from the web document that the user is currently reading. Also, the contextual advertising service may readily display the identified advertising for the user. In this aspect, the contextual advertising service is in the commercial spotlight.

As an example, when a user reads a web document about 'pension', an advertising server supporting the contextual advertising service may identify advertising associated with 'pension', and display the identified advertising for the user.

However, when a big advertiser with a great purchasing power purchases a plurality of keywords associated with 'pension', the advertising server identifies only the big advertiser which purchased the plurality of keywords and displays only the big advertiser's advertising information. Accordingly, small and medium advertisers, which desire to purchase only a small number of keywords and utilize a contextual advertising service, may not have an opportunity to advertise their own advertising information.

Also, a conventional contextual advertising service method displays only a big advertiser's advertising which purchases a plurality of keywords, irrespective of a content of a web document, which results in 'the Poor Get Poorer and the Rich Get Richer' phenomenon in displaying advertising. Accordingly, in the case of the conventional contextual advertising service method, only the big advertiser may enjoy an advertising effect and thereby acquire some benefits.

A representative abusive example of the contextual advertising service has been described above. The abusive example may aggravate users' distrust against the contextual advertising service.

Accordingly, a new advertising list creating model capable of controlling 'the Poor Get Poorer and the Rich Get Richer' phenomenon in displaying advertising by appropriately applying a predetermined penalty value to a rank value to be assigned to each of advertising information of a big advertiser and thereby limiting displaying of the big advertiser's advertising information and instead increasingly displaying advertising information of small and medium advertisers is needed.

BRIEF SUMMARY

An aspect of the present invention provides a method and system for creating an advertising list, which can control 'the Poor Get Poorer and the Rich Get Richer' phenomenon in displaying advertising where a big advertiser's advertising information with a great purchasing power is preferentially displayed in an advertising list and thus small and medium advertisers' advertising information may not be displayed.

Another aspect of the present invention also provides a method and system for creating an advertising list, which can apply a predetermined penalty value to a big advertiser purchasing a plurality of keywords, and thereby can prevent the advertising list from including only the big advertiser's advertising information, unassociated with a content of a content page, and being displayed for a user, and also can increase a probability of displaying advertising information of small and medium advertisers.

According to an aspect of the present invention, there is provided a method of creating an advertising list including advertising information of a big advertiser, the method including the steps of: extracting advertising information responsive to at least one text-in-keyword from a database, the text-in-keyword being derived from a web document; assigning a rank value to at least some of the extracted advertising information; updating the rank value by applying a predetermined penalty value to advertising information if more than a predetermined number of the advertising information for the same advertiser is included in the extracted advertising information; and assigning an advertisement associated with the advertising information for display according to the updated rank value of the advertising information.

According to another aspect of the present invention, there is provided a system of creating an advertising list including advertising information of a big advertiser, the system including: an information extractor extracting advertising information associated with a text-in-keyword from a database, the text-in-keyword being identified according to a predetermined identification process; a point assignment component assigning a rank value to each of the extracted advertising information, and updating the rank value by applying a predetermined penalty value to advertising information of a predetermined level; and a list creator creating the advertising list by sorting the advertising information according to the rank value, wherein the predetermined level corresponds to a portion of address information or description information included in the extracted advertising information, and the point assignment component identifies related advertising information as the big advertiser's advertising information when more than a predetermined number of the address information or the description information is included in the extracted advertising information, and updates a rank value, assigned to the big advertiser's advertising information, by applying a first penalty value to the rank value.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 3, parts i) and ii), illustrate an example of creating an advertising list including a big advertiser's advertising information according to an exemplary embodiment of the present invention;

DETAILED DESCRIPTION OF EMBODIMENTS

Figure 1:
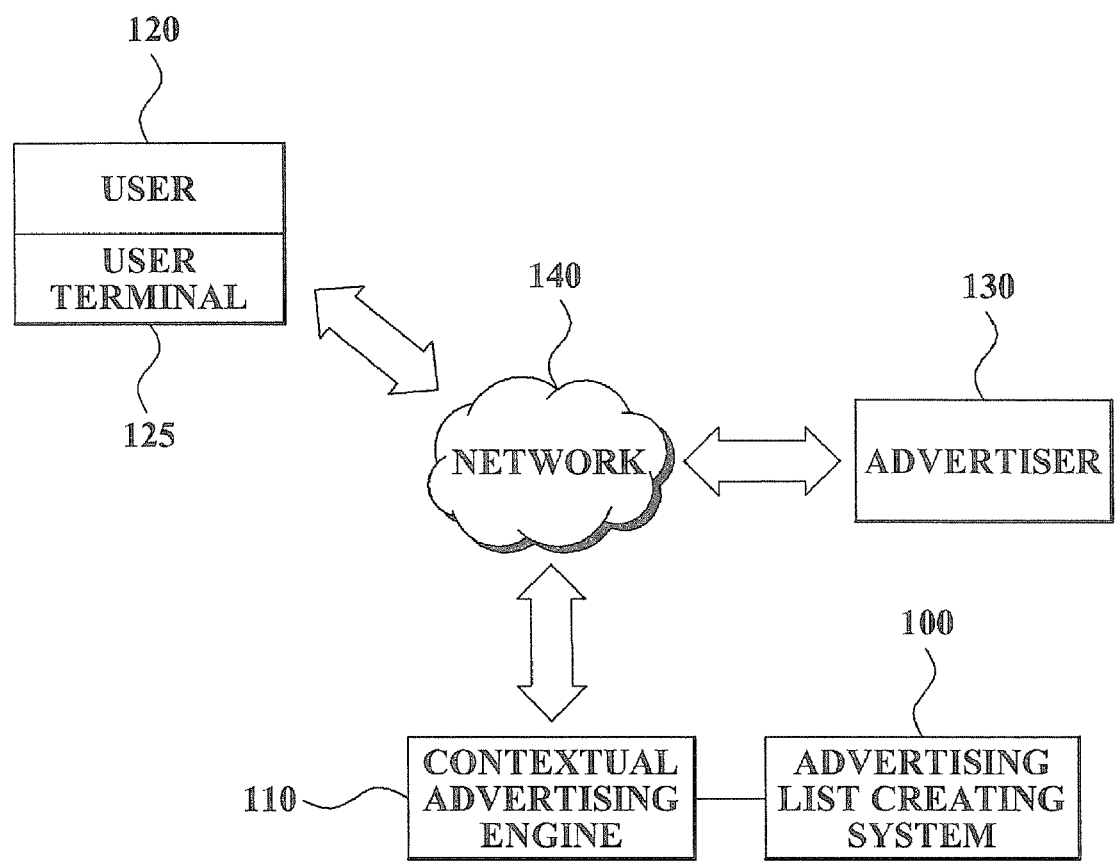
FIG. 1 is a block diagram illustrating an operation of an advertising list creating system according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

The term "contextual advertising" used throughout the present specification may indicate an advertising providing technique or advertising which is displayed corresponding to a content of a web document, i.e. a content page in the present specification. As an example, when a user is reading a web document about travel, a predetermined advertising server supporting the contextual advertising may retrieve advertising information associated with 'travel' and display the retrieved advertising information for the user. In this instance, the advertising server may identify a content of the web document by utilizing a keyword corresponding to a text-in-keyword included in the web document, or other information of the web document.

Specifically, a contextual advertising providing method according to the present invention identifies a big advertiser, which purchased a plurality of keywords, from a plurality of advertisers which purchased a predetermined keyword to utilize the contextual advertising service. Also, the contextual advertising providing method applies a predetermined penalty value to the identified big advertiser. Accordingly, it is possible to overcome problems in a conventional contextual advertising in which only a big advertiser's advertising information, unassociated with a content of a web document is generally retrieved and displayed for a user.

FIG. 1 is a block diagram illustrating an operation of an advertising list creating system 100 according to an exemplary embodiment of the present invention.

The advertising list creating system 100 creates an advertising list when providing contextual advertising. In this instance, the advertising list is displayed for a user 120 according to a content of a web document. Particularly, in the present exemplary embodiment, the advertising list creating system 100 applies a predetermined penalty value to a big advertiser which purchases a plurality of keywords. Accordingly, it is possible to prevent only the big advertiser's advertising information from being displayed for the user 120 only because the big advertiser has a greater purchasing power, and to appropriately display even advertising information of small and medium advertisers'

Figure 2:
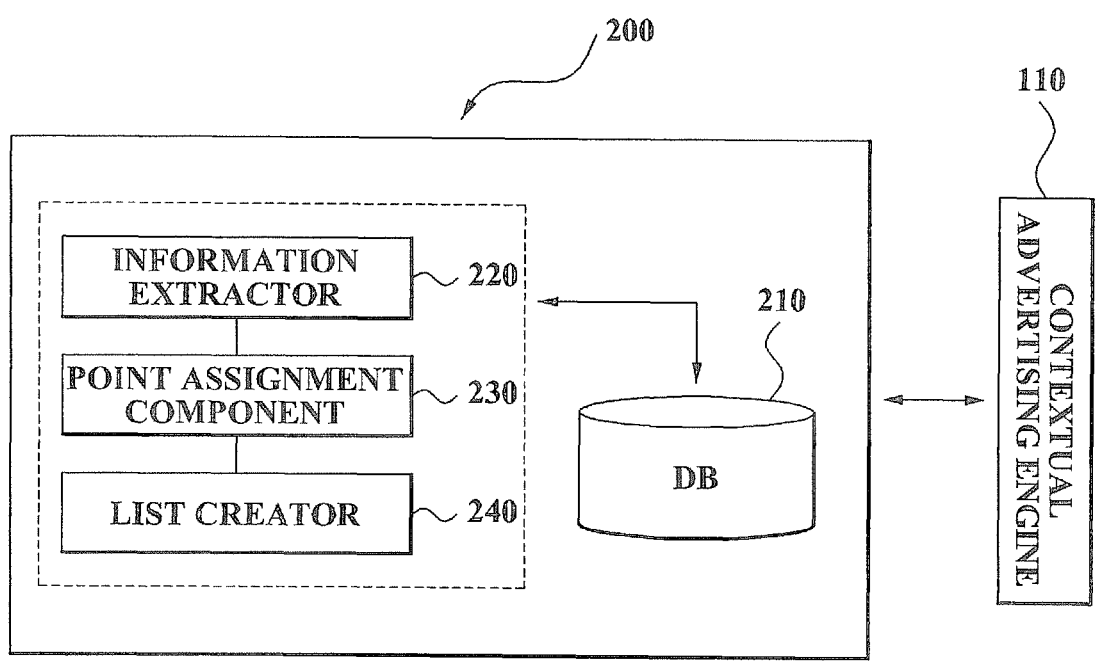
FIG. 2 is a block diagram illustrating a configuration of an advertising list creating system according to an exemplary embodiment of the present invention.

In the advertising list, a plurality of advertising information about an advertiser 130 or corresponding to promotion and marketing materials about business items of the advertiser 130 is sorted according to the predetermined rules. The advertising list may be displayed for the user 20 with the web document, i.e. the content page. Particularly, in the present exemplary embodiment, the advertising list may be created by identifying a text-in-keyword from a content page and utilizing advertising information. In this instance, the content page is created from, for example, a search engine, in response to a search request from the user 120. Also, the advertising information is extracted from a database 210, as shown in FIG. 2, corresponding to the identified text-in-keyword. As described above, the advertising list is created in interoperation with searching, and thus may readily display, for the user 120, advertising information about a field which the user 120 is interested in, and thereby may bring great advertising effects.

A contextual advertising engine 110 may indicate an advertising service server which supports an advertising service by displaying the content page and either the advertising list or advertising information for the user 120. In this instance, the advertising information is retrieved in association with the content page that the user 120 reads.

The user 120 may indicate an Internet user which maintains a user terminal 125 to access the contextual advertising engine 110, and utilizes the content page and advertising information (advertising list) via the user terminal 125.

The advertiser 130 may indicate an operator of a commercial website which displays advertising information of the advertiser 130 corresponding to the content of the content page, and induces the user's access to a corresponding website according to the user's click on the displayed advertising information.

The user terminal 125 maintains a connection state with the advertising list creating system 100 or the contextual advertising engine 110 via a network 140, such as the Internet and the like. Also, the user terminal 125 realizes an advertising list corresponding to the content of the content page that the user 120 reads, and displays the advertising list for the user 120.

The advertising list creating system 100 functions to prevent an advertising list from including only a big advertiser's advertising information unassociated with a content of a content page, and from being displayed for the user 120 by applying a predetermined penalty value to the big advertiser which has a great purchasing power and purchases a plurality of keywords, and thereby to secure an opportunity of appropriately displaying advertising information of small and medium advertisers.

Particularly, the advertising list creating system 100 may identify a big advertiser's advertising information by analyzing advertising information corresponding to a text-in-keyword identified from a content page. Also, the advertising list creating system 100 may determine the size of a predetermined penalty value to be applied to the big advertiser according to a number of the identified advertising information, a number of keywords purchased by the big advertiser, and the like.

Hereinafter, a configuration of an advertising list creating system according to the present invention will be described with reference to FIG. 2.

FIG. 2 is a block diagram illustrating a configuration of an advertising list creating system 200 according to an exemplary embodiment of the present invention.

The advertising list creating system 200 may include a database 210, an information extractor 220, a point assignment component 230, and a list creator 240.

Creating a content page will be described prior to describing the configuration of the advertising list creating system 200.

The content page may correspond to medium information which transmits information to the user 120 via the network 140. The content page may be created through various types of processes. As an example, according to the present exemplary embodiment, a content page corresponding to a search keyword may be created in response to a search request, which is created when a user enters the search keyword in a search site. A search engine is generally in charge of creating a content page corresponding to the search keyword. In this instance, the search engine may appropriately search for a user's desired content and create the content page using the retrieved content. The content page may include a text-in-keyword. The text-in-keyword corresponds to a keyword which is included in a text, and is utilized when reading advertising information according to the contextual advertising.

When the content page is created, the information extractor 220 of the advertising list creating system 200 identifies a text-in-keyword from the content page. Specifically, the information extractor 220 determines whether any one of a plurality of keywords included in the content page matches a keyword, purchased by the advertiser 130 and stored in the database 210, and thereby determines the text-in-keyword. In this instance, the database 210 receives advertising information corresponding to promotion and marketing materials of the advertiser 130, from the advertiser 130, and stores the advertising information in association with the advertiser 130.

Also, when identifying the text-in-keyword, the information extractor 220 may determine whether any one of the plurality of keywords included in the content page matches the keyword, purchased by the advertiser 130 and stored in the database 210, and thereby determine at least one text-in-keyword. As an example, when a content page including a content such as 'dictionary in your mobile phone' is created, the information extractor 220 may identify a keyword '010' purchased by the advertiser 130, as the text-in-keyword, from the plurality of keywords included in the content page.

Also, when identifying the text-in-keyword, the information extractor 220 may analyze the content page and then select a predetermined keyword capable of representing a content of the content page, as the text-in-keyword. As an example, when the content page including the content 'dictionary in your mobile phone' is created, the information extractor 220 may identify a keyword 'dictionary mobile phone', as the text-in-keyword, corresponding to the content of the content page.

Also, the information extractor 220 may extract advertising information corresponding to the identified text-in-keyword, as an advertising candidate target, from the database 210.

The point assignment component 230 assigns a rank value to each of the extracted advertising information. Specifically, the point assignment component 230 assigns the rank value to each of the advertising information which is extracted from the database 210 corresponding to the identified text-in-keyword. In this instance, the rank value is utilized to determine a location of corresponding advertising information in the advertising list. When assigning the rank value, the point assignment component 230 may determine the rank value of individual advertising information, based on, for example, a cost per click (CPC), a cost per impression (CPI), a valid click rate, and the like. According to another exemplary embodiment of the present invention, the point assignment component 230 may assign the rank value by adding up an advertising point, a seed point, and the like, depending upon characteristics of contextual advertising. In this instance, the advertising point is assigned by considering that the identified text-in-keyword is included in description information of advertising information. Also, the seed point is assigned according to property of the content page.

Also, the point assignment component 230 may update the rank value by applying a predetermined penalty value to the rank value assigned to advertising information of a predetermined level. In this instance, the predetermined level may correspond to a standard to determine whether particular advertising information may correspond to a big advertiser's advertising information or whether a particular advertiser corresponds to a big advertiser that purchased a plurality of keywords.

In the present exemplary embodiment, the predetermined level may be defined by a portion of address information included in the extracted advertising information. The address information may include address information, for example, a Universal Resource Locator (URL), and the like, which induces the user 120 to connect with a website of the advertiser 130 when the user 120 clicks the advertising information. Specifically, the point assignment component 230 may identify related advertising information as the big advertiser's advertising information when more than a predetermined number of the address information or the description information is included in the extracted advertising information corresponding to the text-in-keyword.

As an example, when at least two of advertising information, which is extracted as the advertising candidate target, matches address information, for example, a URL, the point assignment component 230 may identify the advertising information as the advertising information related to a single advertiser 130, and determine the advertiser 130 as the big advertiser.

Also, in the present exemplary embodiment, the predetermined level may be defined by a portion of description information included in the extracted advertising information. In this instance, the description information includes summary data about the advertising information, the advertiser 130, the commercial items of the advertiser 130, and the like, in a text format. Accordingly, the user 120 may readily acquire information about the advertiser 130 or promotion and marketing materials about the commercial items of the advertiser 130 through the description information. Specifically, the point assignment component 230 may identify related advertising information as the big advertiser's advertising information when more than a predetermined number of the description information is included in the extracted advertising information corresponding to the text-in-keyword. As an example, when at least three summary data is included in the extracted advertising information, the point assignment component 230 may identify the advertising information as advertising information associated with the single advertiser 130, and determine the advertiser 130 as the big advertiser.

A first penalty value is associated with the big advertiser, and the first penalty value may be set by referring to a predetermined number of identified advertising information in association with the big advertiser. Specifically, the point assignment component 230 reduces the assigned rank value in proportion to the number of advertising information which is identified as the big advertiser's advertising information from the extracted advertising information, and thereby penalizes the big advertiser. The first penalty value may be set in a ratio form of reducing the assigned rank value by a predetermined ratio, in a point form of reducing the assigned rank value to a predetermined value, and the like.

Specifically, the point assignment component 230 may prevent an advertising list from including only advertising information of a big advertiser by determining the big advertiser, and applying a predetermined penalty value to advertising information of the determined big advertiser.

Also, the point assignment component 230 may update the rank value of advertising information by applying a second penalty value. In this instance, the second penalty value is set according to a number of keywords purchased by the advertiser 130, which is determined as the big advertiser, and stored in the database 210. Specifically, the second penalty value appropriately adjusts the rank value of advertising information in proportion to the number of keywords purchased by the big advertiser and thus may be set in a ratio form, a point form, and the like, which is similar to the first penalty value.

The list creator 240 creates the advertising list, which is created by sorting advertising information according to the rank value, corresponding to the text-in-keyword. Specifically, the list creator 240 creates the advertising list by sorting advertising information. In this instance, a location of each of the advertising information is determined according to the assigned rank value. Also, the list creator 240 makes the text-in-keyword correspond to the created advertising list. Accordingly, the created advertising list may be displayed for the user 120 depending upon identifying of the text-in-keyword.

When creating the advertising list, the list creator 240 may determine the location of each of advertising information in the advertising list according to the assigned rank value. As an example, the list creator 240 may display advertising information with a top-rank value in a most eye-catching top portion of the advertising list.

The created advertising list may be displayed for the user 120 with the content page that is created in response to a search request from the user 120. In the present exemplary embodiment, an area distinguished from a display area of the content page may be constructed as a display area of the advertising list depending upon support of the contextual advertising. In this instance, the contextual advertising engine 110 is controlled so that the advertising list created by the advertising list creating system 200 may be displayed on the display area. The advertising list may be readily displayed for the user 120 which reads the content page.

As described above, small and medium advertisers may not have an opportunity of displaying their advertising information due to the big advertiser which purchases a plurality of keywords which results in the displaying of advertising information of the big advertiser every time a content page is created. However, according to the present invention, it is possible to display advertising information of the small and medium advertisers for the user 120.

FIG. 3, parts i) and ii), illustrate an example of creating an advertising list including a big advertiser's advertising information according to an exemplary embodiment of the present invention.

In FIG. 3, a content page including a content 'dictionary in your mobile phone' is created.

The advertising list creating system 200 compares a keyword purchased by the advertiser 130 with keywords included in the content page as shown in part i) of FIG. 3, and then identifies a text-in-keyword '010' from the content page. Also, the advertising list creating system 200 may search the database 210 for advertising information corresponding to the identified text-in-keyword '010', and may extract four advertising information, such as 'auction 010 purchase', 'auction 010 shopping', 'auction 010 mobile phone', and '010 mobile phone shop', as shown in part ii) of FIG. 3.

The advertising list creating system 200 may assign a rank value to each of the extracted advertising information, and then apply a predetermined penalty value to a rank value of advertising information, which is identified as a big advertiser's advertising information. As shown in part ii) of FIG. 3, the advertising list creating system 200 may sum up, for example, an advertising point, a seed point, and the like, and assign the rank value to each of the advertising information. Also, the advertising list creating system 200 may multiply '97/100', corresponding to the first penalty value, by each of the advertising information, which is identified as the big advertiser's advertising information, such as 'auction 010 purchase', 'auction 010 shopping', and 'auction 010 mobile phone', and thereby update the assigned rank value.

When identifying the big advertiser, the advertising list creating system 200 may compare address information of the extracted advertising information, and identify the advertising information, 'auction 010 purchase', 'auction 010 shopping', and 'auction 010 mobile phone', with the same address information URL 'www.auction.co.kr', as advertising information associated with a big advertiser 'auction'.

Also, when setting the first penalty value, the advertising list creating system 200 may identify that three advertising information associated with 'auction' are included in the extracted advertising information, and set the first penalty value to '97/100' corresponding to the identified value. In this instance, the size of the first penalty value may be arbitrarily set by an operator considering a system environment.

After applying the first penalty value to the rank value, the advertising list creating system 200 may count a total number of keywords, purchased by the big advertiser and stored in the database 210, and apply a second penalty value to the rank value. In this instance, the second penalty value is set corresponding to the counted number of keywords. As an example, when a total of 100 keywords are stored in the database 210 by the big advertiser 'auction' for contextual advertising, the advertising list creating system 200 may set the second penalty value to '900/1000' by considering the counted value. Also, the size of the second penalty value may be arbitrarily set by the operator considering the system environment.

Accordingly, the advertising list creating system 200 may reduce a rank value of corresponding advertising information by applying the first penalty value and the second penalty value to each of advertising information of the big advertiser. As an example, as shown in part ii) of FIG. 3, the advertising list creating system 200 may apply the first penalty value and the second penalty value to 'auction 010 purchase' corresponding to the big advertiser's advertising information, and thereby reduce an initially assigned rank value from '20' to '17.46'.

The advertising list creating system 200 creates the advertising list where advertising information is sorted according to the rank value of advertising information. Specifically, the advertising list creating system 200 may create the advertising list displaying advertising information '010 mobile phone shop', which ranks on top through updating, in a top portion of the advertising list.

As described above, according to the present invention, it is possible to control 'the Poor Get Poorer and the Rich Get Richer' phenomenon in displaying advertising, which generally occurs in the conventional advertising list creating method of preferentially displaying advertising information of a big advertiser with a great purchasing power in the advertising list or displaying the advertising information in a place with an excellent advertising effect, and thereby giving small and medium advertisers fewer opportunities to display advertising information of the small and medium advertisers.

In FIG. 3, all extracted advertising information is displayed on the advertising list, however, only a portion of the extracted advertising information may be selected and displayed on the advertising list by considering an environment of creating the advertising list or a display environment of the advertising list.

Hereinafter, an operational flow of an advertising list creating system according to an exemplary embodiment of the present invention will be described in detail.

Figure 4:
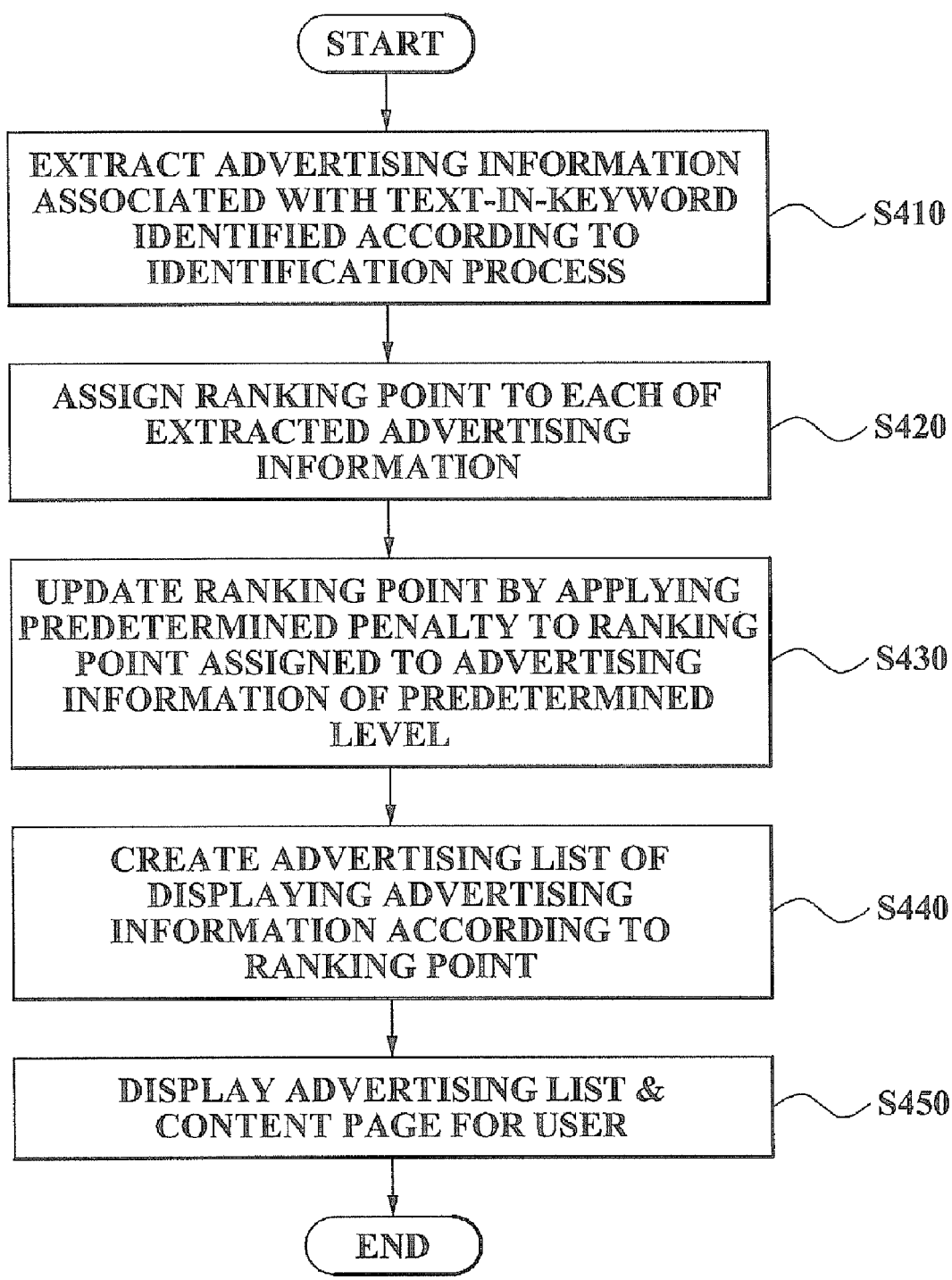
FIG. 4 is a flowchart illustrating a method of creating an advertising list including a big advertiser's advertising information according to an exemplary embodiment of the present invention.

FIG. 4 is a flowchart illustrating a method of creating an advertising list including a big advertiser's advertising information according to an exemplary embodiment of the present invention.

The method of creating an advertising list is performed by the above-described advertising list creating system 200.

In operation S410, the advertising list creating system 200 extracts advertising information associated with a text-in-keyword from the database 210. In this instance, the text-in-keyword is identified according to a predetermined identification process. Operation S410 is a process of identifying a text-in-keyword corresponding to a content of a content page, and extracting advertising information corresponding to the identified text-in-keyword, as an advertising candidate target, from the database 210.

When identifying the text-in-keyword, the advertising list creating system 200 may identify a keyword, purchased by the advertiser 130 and stored in the database 210, from a plurality of keywords included in the content page. According to another exemplary embodiment of the present invention, the advertising list creating system 200 may identify a predetermined keyword corresponding to a content of the content page, as the text-in-keyword.

In operation S420, the advertising list creating system 200 assigns a rank value to each of the extracted advertising information. Operation S420 is a process of applying a rank value to each of advertising information extracted corresponding to the identified text-in-keyword. As an example, the advertising list creating system 200 may add an advertising point depending upon whether the text-in-keyword is included in description information of advertising information, a seed point according to a property of the content page, and the like, and assign the results of the addition, as the rank value, to each of the advertising information.

In operation S430, the advertising list creating system 200 updates the rank value by applying a predetermined penalty value to the rank value assigned to advertising information of a predetermined level. Operation S430 is a process of identifying the big advertiser's advertising information from the extracted advertising information, and applying a predetermined penalty value to each of the identified advertising information to reduce the rank value of the big advertiser's advertising information. Hereinafter, a method of determining a big advertiser will be described in detail with reference to FIGS. 5 and 6.

Figure 5:
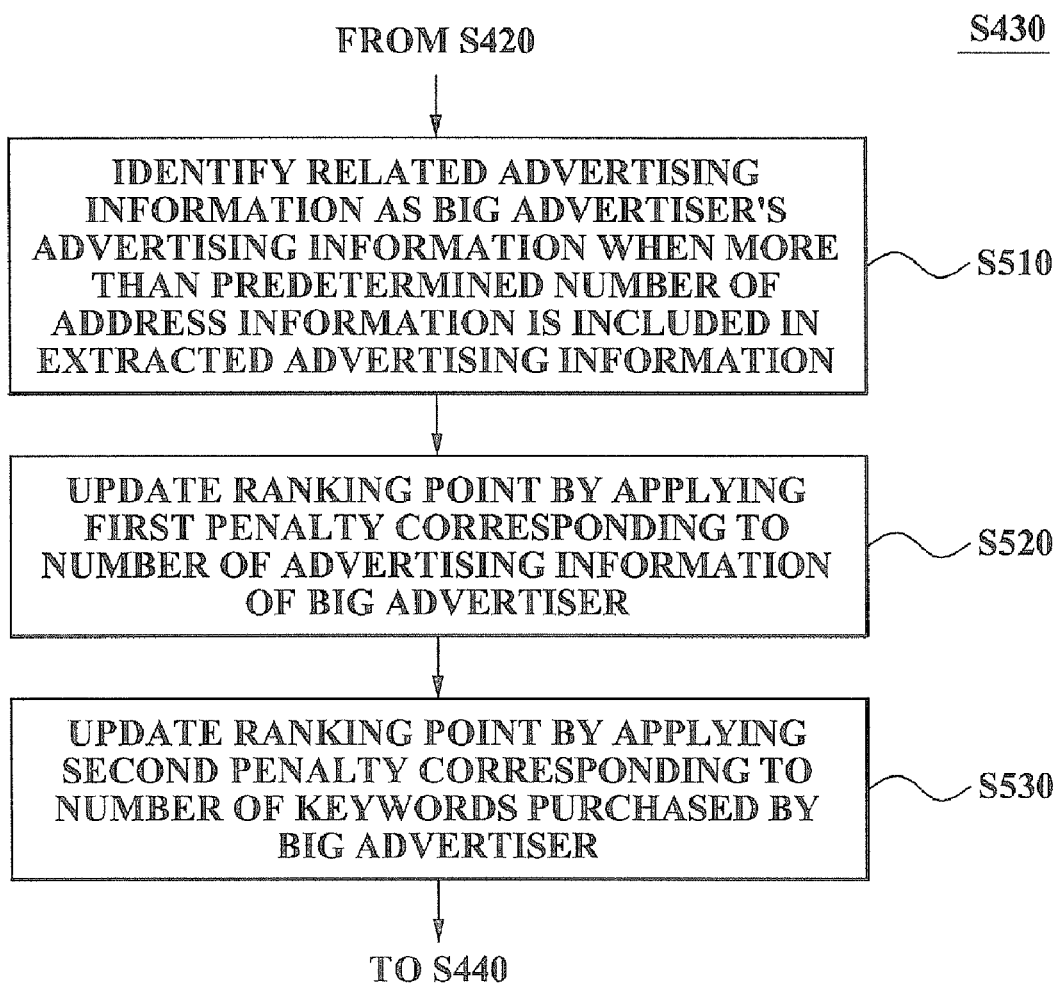
FIG. 5 is a flowchart illustrating an example of applying a predetermined penalty value to a big advertiser according to an exemplary embodiment of the present invention.

FIG. 5 is a flowchart illustrating an example of applying a predetermined penalty value to a big advertiser according to an exemplary embodiment of the present invention.

In operation S510, the advertising list creating system 200 identifies related advertising information as the big advertiser's advertising information when more than a predetermined number of address information is included in the extracted advertising information. Operation S510 is a process of determining the advertiser 130 of corresponding advertising information as a big advertiser when a plurality of advertising information associated with the single advertiser 130 is extracted corresponding to the text-in-keyword. Specifically, in operation S510, the advertising list creating system 200 identifies advertising information with the same address information, for example, URL, from advertising information extracted corresponding to the text-in-keyword, and determines the advertiser 130, associated with the identified advertising information, as the big advertiser.

In operation S520, the advertising list creating system 200 updates a rank value, assigned to the big advertiser's advertising information, by applying a first penalty value to the rank value. Operation S520 is a process of setting the first penalty value in proportion to a number of advertising information, which is identified as the big advertiser's advertising information from the extracted advertising information, applying the first penalty value to the identified advertising information and thereby reducing the rank value of the big advertiser's advertising information.

In operation S530, the advertising list creating system 200 updates the rank value by applying a second penalty value to the rank value assigned to the advertising information. In this instance, the second penalty value is set by considering a number of keywords that the advertiser 130, identified as the big advertiser, purchased in association with the contextual advertising. Operation S530 is a process of counting a number of keywords stored in the database 210 in association with the big advertiser, and updating the rank value, assigned to the big advertiser's advertising information, by applying the second penalty value to the rank value. In this instance, the second penalty value is set by referring to the counted number of keywords.

In the present exemplary embodiment, the second penalty value is applied after the first penalty value is applied to the rank value. However, according to another exemplary embodiment of the present invention, the second penalty value alone may be applied to the rank value to thereby update the rank value, irrespective of whether the first penalty value is applied.

As described above, according to the present invention, it is possible to appropriately control a rank value in proportion to a number of advertising information of a big advertiser, which is extracted corresponding to a text-in-keyword, and thereby to prevent only the big advertiser's advertising information from being displayed for the user 120.

Figure 6:
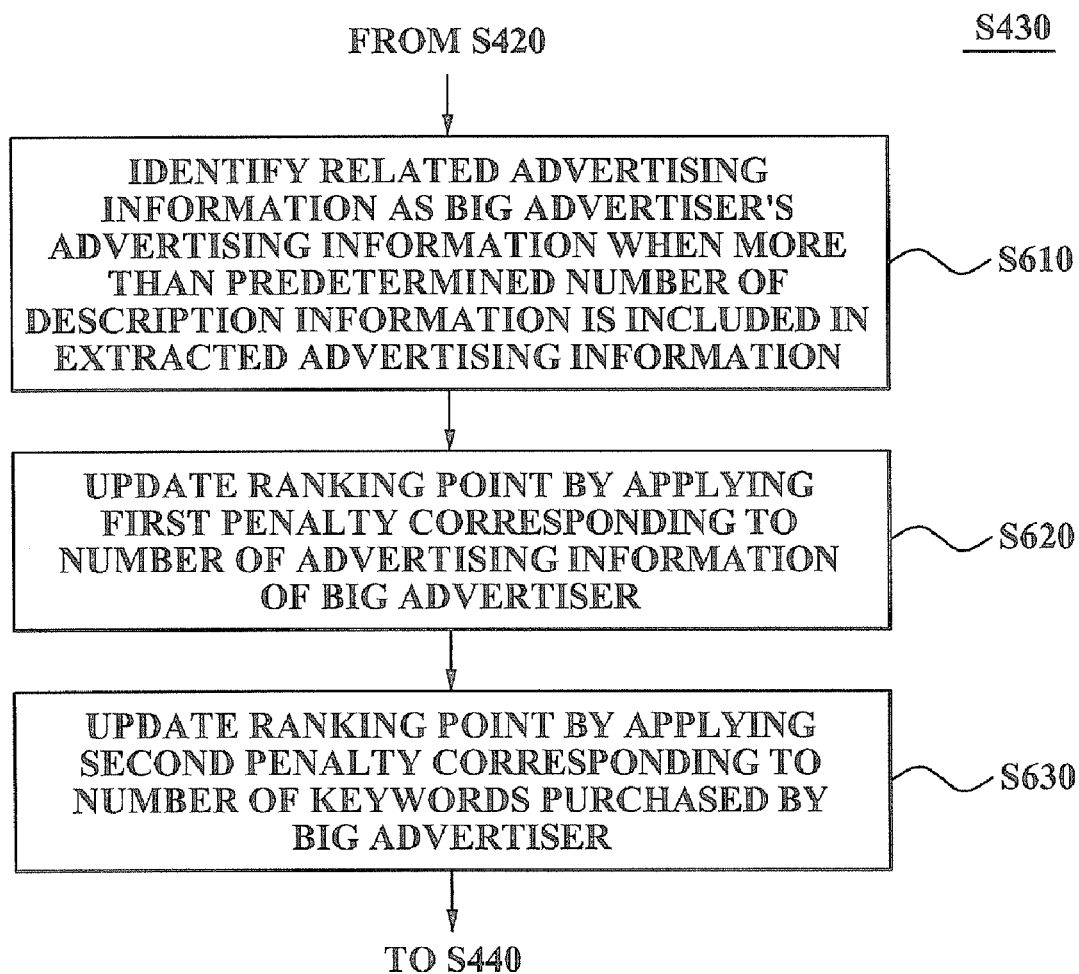
FIG. 6 is a flowchart illustrating an example of applying a predetermined penalty value to a big advertiser according to another exemplary embodiment of the present invention.

FIG. 6 is a flowchart illustrating an example of applying a predetermined penalty value to a big advertiser according to another exemplary embodiment of the present invention.

In operation S610, the advertising list creating system 200 identifies related advertising information as the big advertiser's advertising information when more than a predetermined number of description information is included in the extracted advertising information. Operation S610 is a process of determining the advertiser 130 of corresponding advertising information as a big advertiser when a plurality of advertising information associated with the single advertiser 130 is extracted corresponding to the text-in-keyword. Specifically, in operation S610, the advertising list creating system 200 identifies whether a plurality of advertising information with the same description information, for example, summary data of the advertiser 130, is included in the extracted advertising information, and determines the advertiser 130, associated with the identified advertising information, as the big advertiser.

In operation S620, the advertising list creating system 200 updates a rank value, assigned to the big advertiser's advertising information, by applying a first penalty value to the rank value. Operation S620 is a process of setting the first penalty value in proportion to a number of advertising information, which is identified as the big advertiser's advertising information from the extracted advertising information, applying the first penalty value to the identified advertising information and thereby reducing the rank value of the big advertiser's advertising information.

In operation S630, the advertising list creating system 200 updates the rank value by applying a second penalty value to the rank value assigned to the advertising information. In this instance, the second penalty value is set by considering a number of keywords that the advertiser 130, identified as the big advertiser, purchased in association with the contextual advertising. Operation S630 is a process of counting a number of keywords stored in the database 210 in association with the big advertiser, and updating the rank value, assigned to the big advertiser's advertising information, by applying the second penalty value to the rank value. In this instance, the second penalty value is set by referring to the counted number of keywords.

In the present exemplary embodiment, the second penalty value is applied after the first penalty value is applied to the rank value. However, according to another exemplary embodiment of the present invention, the second penalty value alone may be applied to the rank value to thereby update the rank value, irrespective of whether the first penalty value is applied.

As described above, according to the present invention, it is possible to appropriately control a rank value in proportion to a number of advertising information of a big advertiser, which is extracted corresponding to a text-in-keyword, and thereby to prevent only the big advertiser's advertising information from being displayed for the user 120.

Also, according to the present invention, it is possible to adjust a rank value of advertising information to an appropriate value by considering a corresponding advertiser's purchasing power.

Referring again to FIG. 4, in operation S440, the advertising list creating system 200 creates the advertising list corresponding to the text-in-keyword. In this instance, the advertising list sorts the advertising information by considering the rank value. Operation S440 is a process of creating the advertising list by determining a location of each of advertising information in the advertising list according to the assigned rank value, and displaying the advertising information in the determined location. Also, the advertising list creating system 200 may provide an environment where it is possible to make the created advertising list correspond to the text-in-keyword and thereby determine the advertising list to be displayed for the user 120 with the content page.

In operation S450, the advertising list creating system 200 displays the created advertising list and the content page for the user 120. Operation S450 is a process of controlling the contextual advertising engine 110, supporting contextual advertising, to display the content page and the advertising list, which is created in association with the content of the content page, for the user 120.

Therefore, according to the present invention, it is possible to overcome problems in conventional contextual advertising of displaying a big advertiser's advertising information, less associated with a content page, just because the big advertiser purchased a plurality of keywords, and thereby control 'the Poor Get Poorer and the Rich Get Richer' phenomenon in displaying advertising.

Also, according to the present invention, it is possible to appropriately apply a predetermined penalty value to a rank value assigned to each of advertising information of a big advertiser. Accordingly, the big advertiser's advertising information may be limitedly displayed and advertising information of small and medium advertisers may be increasingly displayed.

The advertising list creating method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter.

According to the present invention, there is provided a method and system for creating an advertising list, which can control 'the Poor Get Poorer and the Rich Get Richer' phenomenon in displaying advertising where a big advertiser's advertising information with a great purchasing power is preferentially displayed in an advertising list and thus small and medium advertisers' advertising information may not be displayed.

Also, according to the present invention, there is provided a method and system for creating an advertising list, which can apply a predetermined penalty value to a big advertiser purchasing a plurality of keywords, and thereby can prevent the advertising list from including only the big advertiser's advertising information, unassociated with a content of a content page, and being displayed for a user, and also can increase a probability of displaying advertising information of small and medium advertisers.

Although a few exemplary embodiments of the present invention have been shown and described, the present invention is not limited to the described exemplary embodiments.

Instead, it would be appreciated by those skilled in the art that changes may be made to these exemplary embodiments without departing from the principles and spirit of the invention, the scope of which is defined by the claims and their equivalents.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A computer implemented method that utilizes a processor to provide context-based advertisements, the method comprising:

extracting advertising information responsive to at least one text-in-keyword from a database, the text-in-keyword being derived from a web document;

assigning a rank value to at least some of the extracted advertising information;

updating the rank value using the processor, by applying a predetermined penalty value to advertising information, if more than a predetermined number of the advertising information for the same advertiser is included in the extracted advertising information; and assigning an advertisement associated with the advertising information for display, according to the updated rank value of the advertising information.

2. The method of claim 1, wherein updating the rank value comprises:

identifying related advertising information for the same advertiser when more than a predetermined number of the address information or the description information for the same advertiser is included in the extracted advertising information; and updating the rank value, assigned to said advertiser's advertising information, by applying a first penalty value to the rank value of said advertiser, wherein the first penalty value is set by referring to the predetermined number of advertising information.

3. The method of claim 1, wherein updating the rank value further comprises:

counting the number of keywords which are stored in the database in association with the same advertiser of the identified advertising information; and updating the rank value, assigned to said advertiser's advertising information, by applying a second penalty value to the rank value of said advertiser, wherein the second penalty value is set by referring to the counted number of keywords.

4. The method of claim 1, further comprising:

creating a web document in response to a search request from a user; and identifying a keyword, as the text-in-keyword, from a plurality of keywords included in the web document, the keyword generating match with the corresponding keyword stored in the database.

5. The method of claim 4, further comprising:

controlling a contextual advertising engine to display the created advertising list and the web document for the user.

6. A non-transitory computer-readable recording medium storing a program for implementing a method for providing context-based advertisements, the method comprising:

extracting advertising information responsive to at least one text-in-keyword from a database, the text-in-keyword being derived from a web document;

assigning a rank value to at least some of the extracted advertising information;

updating the rank value by applying a predetermined penalty value to advertising information if more than a predetermined number of the advertising information for the same advertiser is included in the extracted advertising information; and assigning an advertisement associated with the advertising information for display according to the updated rank value of the advertising information.

7. The computer-readable recording medium of claim 6, wherein updating the rank value comprises:

identifying related advertising information for the same advertiser when more than a predetermined number of the address information or the description information for the same advertiser is included in the extracted advertising information; and updating the rank value, assigned to said advertiser's advertising information, by applying a first penalty value to the rank value of said advertiser, wherein the first penalty value is set by referring to the predetermined number of advertising information.

8. The computer-readable recording medium of claim 6, wherein updating the rank value further comprises:

counting the number of keywords which are stored in the database in association with the same advertiser of the identified advertising information; and updating the rank value, assigned to said advertiser's advertising information, by applying a second penalty value to the rank value of said advertiser, wherein the second penalty value is set by referring to the counted number of keywords.

9. The computer-readable recording medium of claim 6, further comprising:

creating a web document in response to a search request from a user; and identifying a keyword, as the text-in-keyword, from a plurality of keywords included in the web document, the keyword generating match with the corresponding keyword stored in the database.

10. The computer-readable recording medium of claim 9, further comprising:

controlling a contextual advertising engine to display the created advertising list and the content page for the user.

11. A system of creating an advertising list including advertising information of a big advertiser, the system comprising:

a data store;

an information extractor configured for extracting advertising information associated with a text-in-keyword stored in the data store, the text-in-keyword being identified according to a predetermined identification process;

a point assignment component configured for assigning a rank value to each of the extracted advertising information, and updating the rank value by applying a predetermined penalty value to advertising information of a predetermined level; and a list creator configured for creating the advertising list by sorting the advertising information according to the rank value, wherein the predetermined level corresponds to a portion of address information or description information included in the extracted advertising information, and the point assignment component includes a processor that identifies related advertising information as the big advertiser's advertising information, when more than a predetermined number of the address information or the description information is included in the extracted advertising information, and updates a rank value, assigned to the big advertiser's advertising information, by applying a first penalty value to the rank value.

12. The system of claim 11, wherein the first penalty value is set by referring to the predetermined number of advertising information, which is identified as the big advertiser's advertising information.

13. The system of claim 11, wherein the point assignment component counts a number of keywords which are stored in the data store in association with the big advertiser of the identified advertising information, and updates the rank value, assigned to the big advertiser's advertising information, by applying a second penalty value to the rank value, the second penalty value being set by referring to the counted number of keywords.

14. The system of claim 11, wherein the identification process creates a content page in response to a search request from a user, and identifies a keyword, as the text-in-keyword, from a plurality of keywords included in the content page, the keyword matching the same keyword stored in the data store.

15. The system of claim 14, wherein the list creator controls a contextual advertising engine to display the created advertising list and the content page for the user.

* * * * *